(12) United States Patent
Lasala

(10) Patent No.: US 7,537,221 B2
(45) Date of Patent: May 26, 2009

(54) SNOW-SLIDING VEHICLE

(76) Inventor: Philippe Lasala, 15, rue Principale, 67110 Uttenhoffen (FR)

( * ) Notice: Subject to any disclaimer, the term of this patent is extended or adjusted under 35 U.S.C. 154(b) by 450 days.

(21) Appl. No.: 10/585,921

(22) PCT Filed: Jan. 14, 2005

(86) PCT No.: PCT/FR2005/000094

§ 371 (c)(1),
(2), (4) Date: Sep. 5, 2006

(87) PCT Pub. No.: WO2005/007350

PCT Pub. Date: Nov. 8, 2005

(65) Prior Publication Data

US 2007/0267827 A1 Nov. 22, 2007

(30) Foreign Application Priority Data

Jan. 15, 2004 (FR) .................................... 04 00374

(51) Int. Cl.
*B62B 13/00* (2006.01)
*B62B 17/00* (2006.01)
*B62B 19/00* (2006.01)
*A63C 5/04* (2006.01)

(52) U.S. Cl. ...................... 280/16; 280/11.12; 280/845; 280/15; 280/17; 280/22; 280/21.1; 280/22.1; 280/24; 280/28; 280/28.14; 280/12.1; 280/12.13; 280/12.14; 280/609; 280/25; 280/23.1

(58) Field of Classification Search .............. 280/11.12, 280/845, 16, 17, 22, 21.1, 22.1, 24, 28, 28.14, 280/12.1, 12.13, 12.14, 609, 25, 23.1
See application file for complete search history.

(56) References Cited

U.S. PATENT DOCUMENTS

| | | | | |
|---|---|---|---|---|
| 3,351,975 A * | 11/1967 | Goto | .......................... | 16/288 |
| D384,912 S * | 10/1997 | Lanner | ......................... | D12/7 |
| D460,720 S * | 7/2002 | Aguilar | ........................ | D12/8 |
| 6,969,076 B2 * | 11/2005 | Spiers | ..................... | 280/14.28 |
| 2003/0006569 A1 * | 1/2003 | Combs | ....................... | 280/21.1 |
| 2003/0038434 A1 | 2/2003 | Farrally-Plourde | | |
| 2004/0017052 A1 | 1/2004 | Takahashi | | |
| 2004/0075227 A1 * | 4/2004 | Jungnickel | ............... | 280/14.21 |

FOREIGN PATENT DOCUMENTS

| | | |
|---|---|---|
| FR | 2 659 864 | 9/1991 |
| FR | 2 831 127 | 4/2003 |
| GB | 2 171 063 A | 8/1986 |
| WO | WO 00/13956 | 3/2000 |
| WO | WO 01/85526 A | 11/2001 |
| WO | WO 03/018382 A1 | 3/2003 |

* cited by examiner

*Primary Examiner*—Christopher P Ellis
*Assistant Examiner*—John R Olszewski
(74) *Attorney, Agent, or Firm*—Oliff & Berridge, PLC

(57) ABSTRACT

A snow-sliding vehicle including a bearing rear runner and a directional front runner to which is connected a steering column pivoting in a sleeve firmly attached to the upper end of a stiff frame connecting both runners, and the lower end of which is attached to a supporting base surmounting the bearing runner and provided for supporting the feet of the user.

Figure 1:
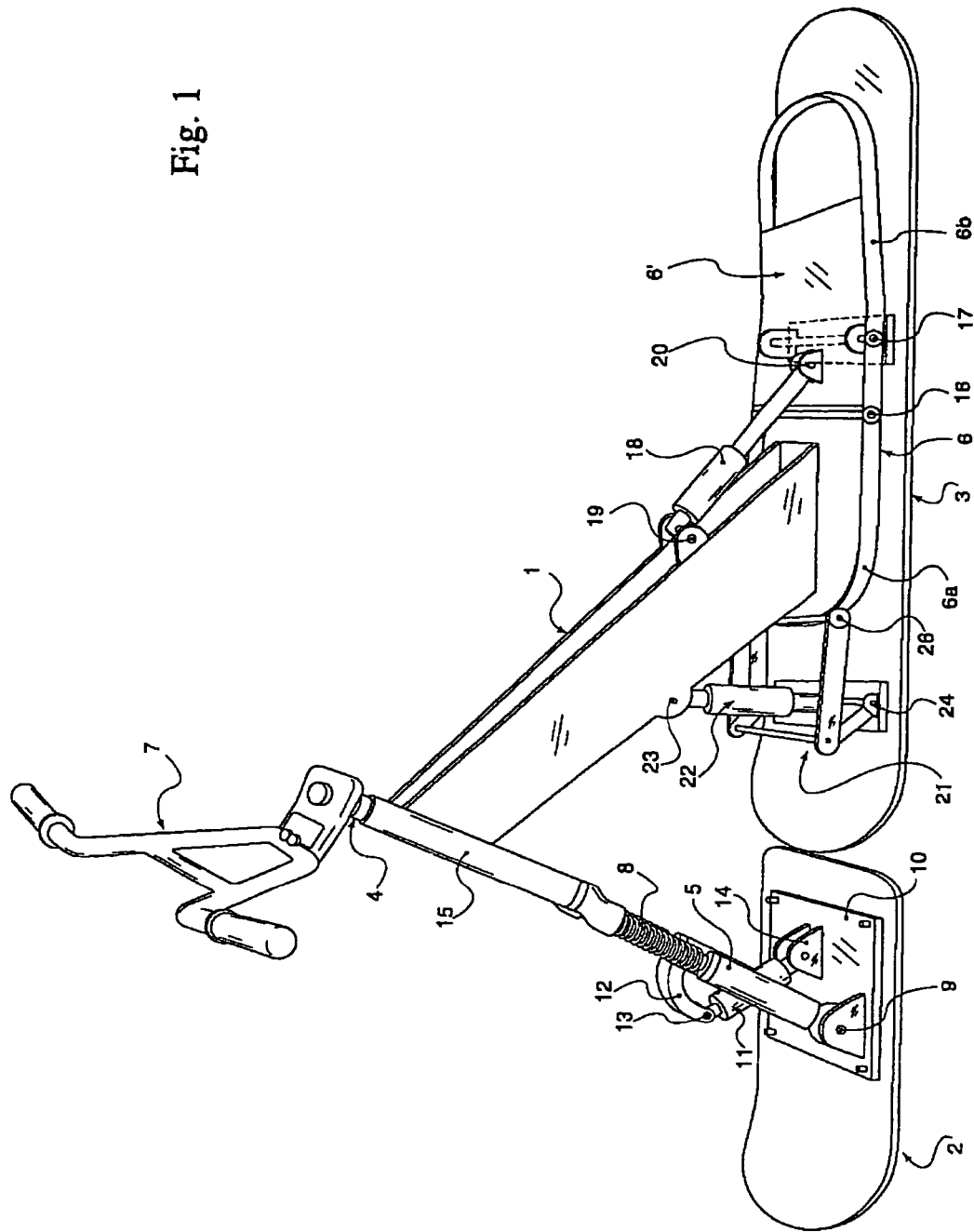

The front portion of said base is connected to the bearing runner by a mechanical connection providing it with clearance ostensibly perpendicular to said runner controlled by a damping device.

12 Claims, 2 Drawing Sheets

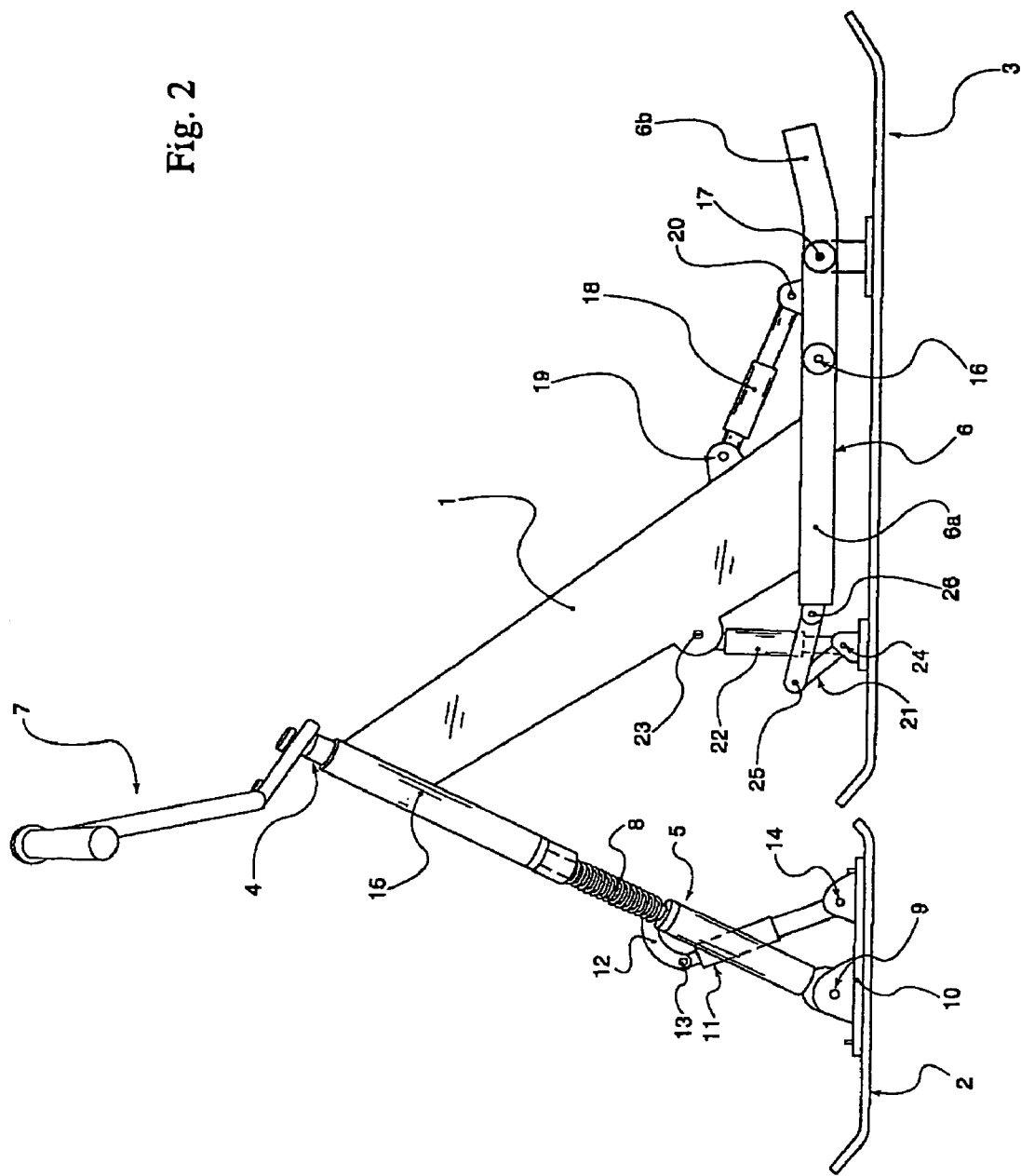

SNOW-SLIDING VEHICLE

The present invention relates to a snow-sliding vehicle with an appearance similar to that of a scooter, the wheels of which are however replaced by runners or planks related to ski technologies, and which therefore includes a bearing rear runner and a directional front runner to which is connected a steering column.

The latter pivots in a sleeve firmly attached to the upper end of a stiff frame connecting said runners together. The lower end of the frame is fixed to a supporting base surmounting the bearing runner and which is provided for supporting the feet of the user. The latter is therefore standing upright on this support, his/her hands holding handlebars. surmounting the steering column and by means of which he/she steers the vehicle.

The configurations of the ground vary from one track to the other, and the bumps, the changes in slopes, the transition from a negative declivity to a positive declivity, etc., entirely form a part of the usual routes encountered during downward runs performed with the vehicle of the invention, and they should give rise on its behalf to a possibility of comfortable and flexible driving.

This possibility notably results from the existence of suspensions and dampers, the relation of which with the runners and the frame should be pertinently provided in terms of positioning for example. The actual design of the frame may also take into account the required adaptability to actual ground variations, to the types of snow (powder, wet, icy) as well as to both sport and calm driving.

The vehicles from the prior art already have, for some of them, damping devices at the fork. For example, this is thus the case for the sliding vehicle described in French patent FR 2 659 864, wherein an air damper connects the base of the fork to the front of the directional runner.

The vehicle described in the French patent FR 2 831 127, as for it, includes two damping devices, one of which is also positioned at the front fork but does not connect the base of the latter to the runner, because of the specific configuration given to this fork, which is not in the axis of the steering column. A trapezoidal device indeed allows the fork to be shifted, the base of which is in contact with the directional runner, from the actual steering column, which develops along a parallel axis. In this case, the damper device connects the base of the steering column to a cross-bar localized between both branches of the fork.

The vehicle described in this document also includes a second damper device, which connects a tilted stabilization bar from the stiff frame to the bearing runner. This structure is more performing than the one which is the object of the aforementioned patent, because the existence of the damping device which connects the stiff frame to the rear runner provides the user with higher comfort and gives the vehicle a much better flexibility of use, as there is no longer any stiff connection between said frame and the rear of the bearing runner.

The plate on which are placed the feet of the user, in this configuration is dissociated from the supporting rear runner, and the connections which they form, allow a complex relative movement organized along several transverse rotation axes, allowing the supporting plate to move closer to or away from the runner.

Such a possibility does not exist in document WO 01/85526, in which the stiff frame is directly mounted on the rear bearing runner, to which it is rigidly attached. Also, the fork of the steering column is directly attached to the directional runner. Only the tilted stabilization bar of the stiff frame is interrupted by an impact-absorbing elastic device, which works in association with a supporting sole separated into two sections with approximately equal length.

The aforementioned structures of the prior art are however not truly satisfactory in the sense that they do not transmit optimally the information, for example the positioning between the directional runner and the rear bearing runner.

For this type of vehicles, the equation to be solved is obviously delicate, the solutions consisting of finding a compromise between the required stiffness of the frame and the requirements that the position of one of the runners be quasi-instantaneously adapted to the position of the other one, so that the vehicle is handleable and preferably flexible for driving regardless of the encountered conditions.

Thus, if it is true that the fork positioned at the lower end of the steering column should damp impacts, vibrations, etc. in the axis of said steering column, the design should further be able to provide interaction between the horizontal movements of the steering column and the positioning of the bearing runner. In fact, in order to operate optimally, the latter would have to follow the movements of the directional runner by reproducing them just after it. This is the goal which is assigned to the invention.

For this purpose, the sliding vehicle of the invention, includes a bearing rear runner and a directional front runner to which a steering column is connected, pivoting in a sleeve firmly attached to the upper end of a stiff frame connecting said runners, and the lower end of which is attached to a supporting base surmounting the bearing runner and provided for supporting the feet of the user, is mainly characterized in that the front portion of said base is connected to the bearing runner through a mechanical connection providing it with clearance ostensibly perpendicular to said runner controlled by a damping device.

This possibility increases the driving flexibility by notably reflecting the accidents of the ground more softly, and allowing the bearing runner to optimally follow the trajectory of the directional runner.

Preferably, said base is jointed with the bearing runner in a location located in the rear half of the base, said joint being directed transversely to the runner.

The front clearance indeed has a repercussion on the totality of the base. Providing such a joint amounts to reducing the stresses on it and on its connection to the runner, which should otherwise be taken into account by the flexibility, elasticity of the materials.

According to one possibility, the base may include a transverse joint substantially localized in its middle, dividing said base into a front portion and a rear portion, jointed with each other.

This middle joint further improves the driving flexibility of the vehicle, as this will be described in more detail in the following.

The combined existence of the aforementioned base/runner mechanical connections and of the division of the supporting base into two portions notably allows complex displacements of the base supporting the feet of the user to be performed according to stresses impulsed by the user and retransmitted through the handlebars, on the one hand, to forces individually exerted by the feet of the user on the other hand, either on the rear portion of the base or on its front portion, and even to reactions caused by the ground or the quality of the snow.

Preferably, according to the invention, the stiff frame is attached to the front portion of the base. The movements of the handlebars notably in an apparent horizontal plane, are therefore passed on via the stiff frame to said front portion of the base. The latter includes two distinct connections, one with the bearing runner and the other with the rear portion of the base. There is no stiffness between both of these connections, and the forces from the accidents of the ground are therefore only partly transmitted to the base, which reduces the intensity of impacts passed on by the bearing slide to the base, and consequently to the legs of the user.

According to one possibility, said front end of the base is jointed with the bearing runner by means of a knuckle joint, the axes of rotation of which are transverse, said knuckle joint being positioned at the front end of the base. This portion of the base may therefore move not only vertically but also forwards and rearwards, according to its vertical position.

The damping device is preferably positioned between the stiff frame and the bearing runner, in the vicinity of the knuckle joint, said damping device being jointed at both of its ends along a pivot axis parallel to the axis of the knuckle joint. This damper, the hardness of which is adjustable, plays a role in transforming the movements of the fork/steering column, and therefore the stresses which are exerted therein, into stresses which are finally exerted on the bearing runner via the base, in order to orientate it in response to the position of the assembly consisting of the steering column and of the directional runner.

When the movement of the fork occurs upward, the plane of the directional runner is basically higher than the plane of the bearer runner, which may cause blocking in the snow, of the tip of the bearer runner in the absence of the system of the invention. Conversely, when the movement of the fork is performed downwards, because of the work of the axial damping device which is integrated thereto, the horizontal plane of the directional runner may be lower than that of the bearing runner, which would no longer be in contact with the ground at certain instants and would make the driving of the vehicle hazardous.

According to one possibility, said knuckle joint includes a dual set of parallel connecting rods, the damping device being positioned between said sets.

In this mechanical structure, by doubling the knuckle joint, the stresses transmitted between the stiff frame and the bearer runner may be distributed into two symmetrical paths relatively to the longitudinal axis of the vehicle. Moreover, taking into account the centering of the damping device relatively to said longitudinal axis, this doubling is essential.

Preferably, the joint connecting the rear portion of the base and the bearing runner is localized in proximity to the joint connecting the front and rear portions of said base. According to the invention, a damping device is further placed between the stiff frame and the rear portion of the base, said device being jointed at its two ends along a transverse pivot axis.

Taking into account these attachments, and depending on the hardness with which it is adjusted, this damping device also transmits with flexibility part of the information coming from the handlebars to the rear portion of the base, which retransmits it to the feet of the user. With this structure, optimum handling of the sliding vehicle may be obtained because there is transmission of information between the hands and feet of the user, each may in return refine the control/displacement impulsed by the other.

At the front, the steering column is attached to the directional front runner through a fork, each branch of which includes an elastically deformable suspension in the direction of the axis of the column, the hardness of which is adjustable.

The combination of damping/suspension systems and more particularly of the front fork and of the damper of the knuckle joint connection, allows optimum movement of the vehicle when the ground is uneven, furthermore retaining comfortable conditions for the user. This notably results from the fact that the vibrations due to the nature of the ground are less felt in the handlebars by means of said fork.

The existence of these damping devices, associated with the flexibility of the runners, also allows smoother movement in the bends, by means of the frame which is in fact separated in two, in its base, by the horizontal transverse axis. With this separation, it is possible to make the stiff frame more flexible, the dampers which have been added, allowing it to return to an initial position while absorbing the stresses due to the user, which are notably due to his/her weight. Moreover, it should be noted that the hardness of the damping systems may be adjusted according to the weight of the user, which allows both portions of the base to remain parallel to the bearing runners, at least in the position of a normal load (with the weight of the user), and to only move when the user exerts overpressures on the middle separation joint. In the absence of a load, the front portion of the base is slightly elevated, and the rear portion is tilted in such a way that its rear end is close to the bearing runner.

According to an important feature of the invention, the steering column is also connected to the director runner via a damping device dually jointed with said column and with the runner according to a transverse pivot axis, and the orientation and application point of which at the rear of the runner allows the damping device to exert an urging force on the rear resulting in the tilting of the plane of said runner and to correlatively displace its front tip upwards.

This damper has the function of maintaining the plane of the tilted directional runner at rest with its front elevated tip, as it is adjusted for pushing downwards and permanently on the rear of the directing runner. For example, when operating on powder snow, with the existence of this damper, the front of the directing runner may not get stuck into soft or deep snow, and one may surf on the snow by assuming a more natural position.

In the devices from the prior art, maintaining the front tip of the raised directing runner forced the user to stand on the rear of the vehicle, and to maintain his/her weight on this rear area in order to raise the front portion, which was hardly comfortable.

The comfort is therefore considerably improved, all the more that, by the flexibility of the frame as explained before, the bearing runner itself tends to tilt its plane so that its front tip is directed upwards, which obviously improves the flotation of the assembly.

Preferably, this damping device is attached to a location of the steering column which is attached axially. In other words, it is located in the lower portion of the column which is not subject to the axial displacements due to the suspensions.

Generally, the separation of the base into two portions, combined with different damping systems as contemplated above, in reality allows a folding movement of the frame which releases at least one portion of the bearing runner, in this case its front portion, from now on more capable of adapting to the configurations of the ground without burdening its freedom of displacement by the weight of the user.

When the front runner reaches a bump, the bearing runner no longer remains in its plane, but permanently maintains contact with the ground.

These possibilities further improve edging, which is first promoted by the flexibility of the runners, but also benefits from the separation of the base into two portions.

Indeed, in order to turn, the user positions himself/herself on a lateral edge, the runner bends and describes a circular arc which defines the trajectory. The more the circular arc is pronounced, more the guiding and the bend are narrow. On very hard snow, edgings are very important, as they allow one to turn in spite of the very slipping nature of the ground.

In the absence of separation between both portions of the base, the bearing runner to which said stiff base is connected, has more difficulty in bending, and only both ends form a circular arc in contact with the snow. Only a portion of the length of the edge is therefore in contact with the snow, whence a much less firm grip, and a risk of falling or loosing control in the bends.

Under the assumption of the invention, as the base is flexible in its middle, it also allows the bearing runner to be flexible in its middle and therefore to describe a circular arc so as to bite into the snow regardless of the type of bends which one wishes to achieve, and for any type of snow. As the connection between the front portion of the bearing runner and the base is also flexible, the curvature of the runner is also ensured at this end.

Less skids are performed consequently, and the trajectories may be closer and more accurate.

The invention will now be described with reference to the appended drawings, for which:

FIG. 1 is a perspective view of a sliding vehicle according to the invention, and FIG. 2 is a side view of it.

With reference to FIG. 1, the sliding vehicle according to the invention includes a stiff frame (1) to which a directional runner (2) and a bearing runner (3) are connected, via respectively a steering column (4) equipped with a lower fork (5) and a base (6) provided for supporting the feet of the user, partially surmounted for this purpose with an anti-skid plate (6'). The steering column (4) is surmounted with conventional handlebars (7) allowing the vehicle to be handled. The lower fork (5) is equipped with axial dampers (8) and is connected to the runner (2) via joints (9). The joint portion (9) which is firmly attached to the directing runner (2) is so attached via a plate (10), for example screwed to said runner (2).

A damping device (11) is implanted between the branches of the fork (5). This device is attached to a console (12) on the one hand, jutting out from a crossbar connecting both arms of the fork (5), under the suspensions (8), and with which the jointed upper attachment (13) of the damping device (11) may be shifted in order to facilitate its change of orientation. At its other end, said device is also attached via a joint (14) to the plate (10).

The whole of the jointed connections to which reference was made up to now, as well as those which will be mentioned in the following, all operate along transverse axes, parallel to each other.

The damping system (11) may for example be of the oleopneumatic type and its hardness is then adjustable by inflating it.

Its action on the rear portion of the directional runner (2) allows the plane of the runner (2) to be maintained without any adjustment, tilted with its front tip raised upwards when no force is exerted thereon.

The connection between the steering column (4) and the stiff frame (1) is made via a sleeve (15) of a single piece with said frame (1). The latter is firmly attached in its lower portion to the base (6). In reality, it is firmly attached to a front portion (6a) of said base, which is jointed with a rear portion (6b) by means of a transverse joint (16). Said base may be considered as being entirely part of the stiff frame (1), of a portion which would be separated into two distinct portions (6a and 6b) which are involved in the originality of the system of the invention. As this is better apparent in FIG. 2, the base (6) is substantially positioned parallel to the bearing runner (3), at a certain distance from the latter. This distance is notably set by a transverse joint (17) around which the rear portion (6b) of the base (6) pivots. In addition to the transverse joint (16), said portion (6b) is connected to the stiff frame (1) via a damping device (18), the ends of which are pivotably mounted, in (19 and 20) to said frame (1) and to the rear portion (6b) of the base, respectively. This damping system which may also be of the oleopneumatic type, has a hardness which is adjustable. It should notably be adapted to the weight of the user, so that the latter, when one or both of his/her feet rest on the base (6), cannot displace it too easily.

The front end of the base (6), i.e., the end of the front portion (6a), is connected to the bearing runner (3) via a mechanism with a dual parallel knuckle joint (21) which surrounds a damping device (22) which may be of the same type as the previous ones. The latter is pivotably mounted in (23) to the frame (1) and at its other end to the bearing runner (3). This last joint does not appear in the figures.

FIG. 2 clearly shows the relative arrangement of the different portions of the sliding vehicle of the invention. In particular, the knuckle joint connection conventionally includes three joint axes (24, 25 and 26). The suspended configuration of the base (6), which is furthermore separated into two portions, one of which is directly dependent on the stiff frame (1), whereas the other one is only subject to its effects via the joint (16) and/or the damping device (18), allows proper transmission of the information arriving from the directing runner (2) towards the bearing runner (3) on the one and, and also of the stresses coming from the handlebars (7)—a priori only intended for the directing runner (2), towards the bearing runner (3). Conversely, this mechanical structure provides return of information, for example from the bearing runner (3) towards the handlebars (7) and the directing runner (2), or from the feet of the user, resting on the base (6), towards the handlebars (7) or the directing runner (2).

Globally, this configuration improves the handleability and the comfort of driving sliding vehicles of this type, very significantly.

The invention claimed is:

1. A vehicle for sliding over snow including a bearing rear runner and a directional front runner to which is connected a steering column pivoting in a sleeve firmly attached to the upper end of a stiff frame connecting both runners, and the lower end of which is attached to a supporting base surmounting the bearing runner and provided for supporting the feet of the user, characterized in that the front portion of said base is connected to the bearing runner by a mechanical connection allowing travels substantially perpendicular to said bearing runner controlled by a damping device.

2. The sliding vehicle according to claim 1, characterized in that said base is jointed with the bearing runner in a location located in the rear half of the base, said joint being orientated transversely to the runner.

3. The sliding vehicle according to claim 1, characterized in that the base includes a transverse joint substantially localized in its middle, dividing said base into a front portion and a rear portion jointed with each other.

4. The sliding vehicle according to claim 3, characterized in that the stiff frame is attached to the front portion of the base.

5. The sliding vehicle according to claim 3, characterized in that the joint connecting the rear portion of the base and the bearing runner is localized in proximity to the joint connecting the front and rear portions of said base.

6. The sliding vehicle according to claim 3, characterized in that a damping device is placed between the stiff frame and the rear portion of the base, said device being jointed at its two ends along a transverse pivot axis.

7. The sliding vehicle according to claim 1, characterized in that the front end of the base is jointed with the bearing runner by means of a knuckle joint, the axes of rotation of which are transverse.

8. The sliding vehicle according to claim 7, characterized in that the damping device is positioned between the stiff frame and the bearing runner, in the vicinity of the knuckle joint, said damping device being jointed at both of its ends along a pivot axis parallel to the axes of the knuckle joint.

9. The sliding vehicle according to claim 8, characterized in that said knuckle joint includes a dual set of parallel connecting rods, the damping device being positioned between said sets.

10. The sliding vehicle according to claim 1, characterized in that the steering column is attached to the directional front runner through a fork, each branch of which includes an elastically deformable suspension in the direction of the axis of the column.

11. The sliding vehicle according to claim 1, characterized in that the steering column is connected to the directing runner through a damping device dually jointed with said column and with the runner along a transverse pivot axis, the orientation and application point of which at the rear of the runner allow the damping device to exert an urging force on the rear resulting in the tilting of the plane of said runner so as to displace its front tip upwards.

12. The sliding vehicle according to claim 11, characterized in that said damping device is attached to a location of the steering column which is attached axially.

* * * * *